United States Patent [19]
Kasugai et al.

[11] Patent Number: 5,640,993
[45] Date of Patent: Jun. 24, 1997

[54] FUEL VAPOR RECOVERY CONTROL VALVE DEVICE

[75] Inventors: Joji Kasugai; Yoshihiro Nagino, both of Aichi, Japan

[73] Assignee: Toyoda Gosei Co., Ltd., Aichi, Japan

[21] Appl. No.: 426,132

[22] Filed: Apr. 21, 1995

[30] Foreign Application Priority Data

Apr. 26, 1994 [JP] Japan ................................. 6-088862

[51] Int. Cl.⁶ ..................................................... F16K 24/04
[52] U.S. Cl. .............................. 137/587; 123/519; 141/59
[58] Field of Search ................................ 137/587, 588; 123/518, 519; 141/59, 302

[56] References Cited

U.S. PATENT DOCUMENTS

| | | | |
|---|---|---|---|
| 4,790,349 | 12/1988 | Harris | 137/587 |
| 5,099,880 | 3/1992 | Szlaga et al. | 137/587 |
| 5,111,795 | 5/1992 | Thompson | 123/519 |
| 5,318,069 | 6/1994 | Harris | 137/588 |
| 5,524,662 | 6/1996 | Benjey et al. | 137/587 X |

FOREIGN PATENT DOCUMENTS 9314366  7/1993  WIPO .

*Primary Examiner*—John Rivell
*Attorney, Agent, or Firm*—Cushman Darby & Cushman, IP Group of Pillsbury Madison & Sutro LLP

[57] ABSTRACT

A fuel vapor recovery control valve device, for controlling the discharge of fuel vapor from a fuel tank having a fuel filler port, includes a housing; a first valve assembly, which is moved up and down by a diaphragm which divides the space in the housing into an upper chamber and a lower chamber; and a second valve assembly provided in the lower chamber. The diaphragm is of double operation film structure including a central node portion, and an intermediate node portion between the central node portion and its outer peripheral portion. A cylindrical partition wall, which is abutted against the central node portion of the diaphragm, divides the upper chamber into an upper inside chamber, which is communicated with a first vapor flow-in port of the housing, and an upper outside chamber, which is communicated through a signal port with the fuel filter port. Thus, the first vapor flow-in port can be sealingly closed by the diaphragm.

4 Claims, 7 Drawing Sheets

FUEL VAPOR RECOVERY CONTROL VALVE DEVICE

BACKGROUND OF THE INVENTION

This invention relates to a fuel vapor recovery system for a motor vehicle, and more particularly to a fuel vapor recovery control valve device in the system.

A fuel vapor recovery system for a motor vehicle as shown in FIG. 1 has been proposed in International Publication PCT/US93/00719. In the system, a fuel vapor recovery valve device, as shown in FIG. 1, is adapted to control the discharge of fuel vapor from a fuel tank 14 having a fuel filler port 12.

More specifically, the device comprises: a housing 16; a first valve assembly 22, which is moved up and down by a diaphragm 42 which divides the space within the housing 16 into an upper chamber 18 and a lower chamber 20; and a second valve assembly (a positive pressure valve) 24 provided in the lower chamber 20. The housing 16 has a vapor recovery port 32 which communicates with a canister 30, a signal port 26 and a first vapor flow-in port 28 on the upper chamber side, and a second vapor flow-in port 34 on the lower chamber side which is controlled (opened and closed) by the second valve assembly 24. The signal port 26 communicates with the fuel filler port 12; the first vapor flow-in port 28 communicates, through a fuel cut-off valve 36, with the fuel tank 14; and the second vapor flow-in port 34 also communicates, through a so-called float valve 38, with the fuel tank 14.

As is apparent from FIG. 1, the first vapor flow-in port 28 is sealingly closed at its lower end. That is, its sealing point corresponds to the central portion of a diaphragm supporting board 40 of relatively large diameter, and thus, the sealing point is far from the operating portion 42a of the diaphragm 42.

Hence, in the case where the diaphragm supporting board 40 is inclined, for instance when the elastic force of a spring 44 applied to the diaphragm supporting board 40 is deflected, it is difficult to absorb the inclination; that is, in this case, it is difficult for the diaphragm 42 to seal closed the first vapor flow-in port 28.

The upper chamber 28 and the lower chamber 20 which are separated in the housing by the diaphragm 42 have no direct communicating path between them. Hence, when vapor flows into the housing from the fuel tank through the fuel cut-off valve 36 and the first vapor flow-in port 28, it may be condensed into liquid. The liquid thus formed may accumulate on the diaphragm with this configuration.

SUMMARY OF THE INVENTION

In view of the foregoing, an object of the invention is to provide a fuel vapor recovery control valve device in which its first vapor flow-in port, communicating with the fuel tank, can be completely closed with the diaphragm valve during the fuel supplying operation.

Another object of the invention is to provide a fuel vapor recovery control valve device in which fuel accumulated on the diaphragm valve can be discharged.

A fuel vapor recovery control valve device for controlling the discharge of fuel vapor from a fuel tank with a fuel filler port, according to the invention, comprises: a housing; a first valve assembly which is moved up and down by a diaphragm which divides the space in the housing into an upper chamber and a lower chamber; and a second valve assembly provided in the lower chamber, the housing having a signal port and a first vapor flow-in port on the upper chamber side, and a fuel recovery port communicated with a canister and a second vapor flow-in port which is opened and closed by the second valve assembly, on the lower chamber side, the signal port being communicated with the fuel filler port, the first vapor flow-in port and the second vapor flow-in port being communicated, respectively, through a fuel cut-off valve and tank full-up regulating valve to the fuel tank, the diaphragm being of double operation film structure including a central node portion and an intermediate node portion between the central node portion and the outer peripheral portion thereof, the upper chamber being divided into an upper inside chamber, which is communicated with the first vapor flow-in port, and an upper outside chamber, which is communicated with the signal port, by a cylindrical partition wall which is abutted against the central node portion of the diaphragm.

In the device, the central node portion of the diaphragm has a communicating hole through which the upper chamber communicates with the lower chamber. A positive pressure valve body is provided to open and close the communicating hole from below.

The nature, utility and principle of the invention will be more clearly understood from the following detailed description and the appended claims when read in conjunction with the accompanying drawings.

DETAILED DESCRIPTION OF THE PREFERRED EMBODIMENTS

Figure 1:
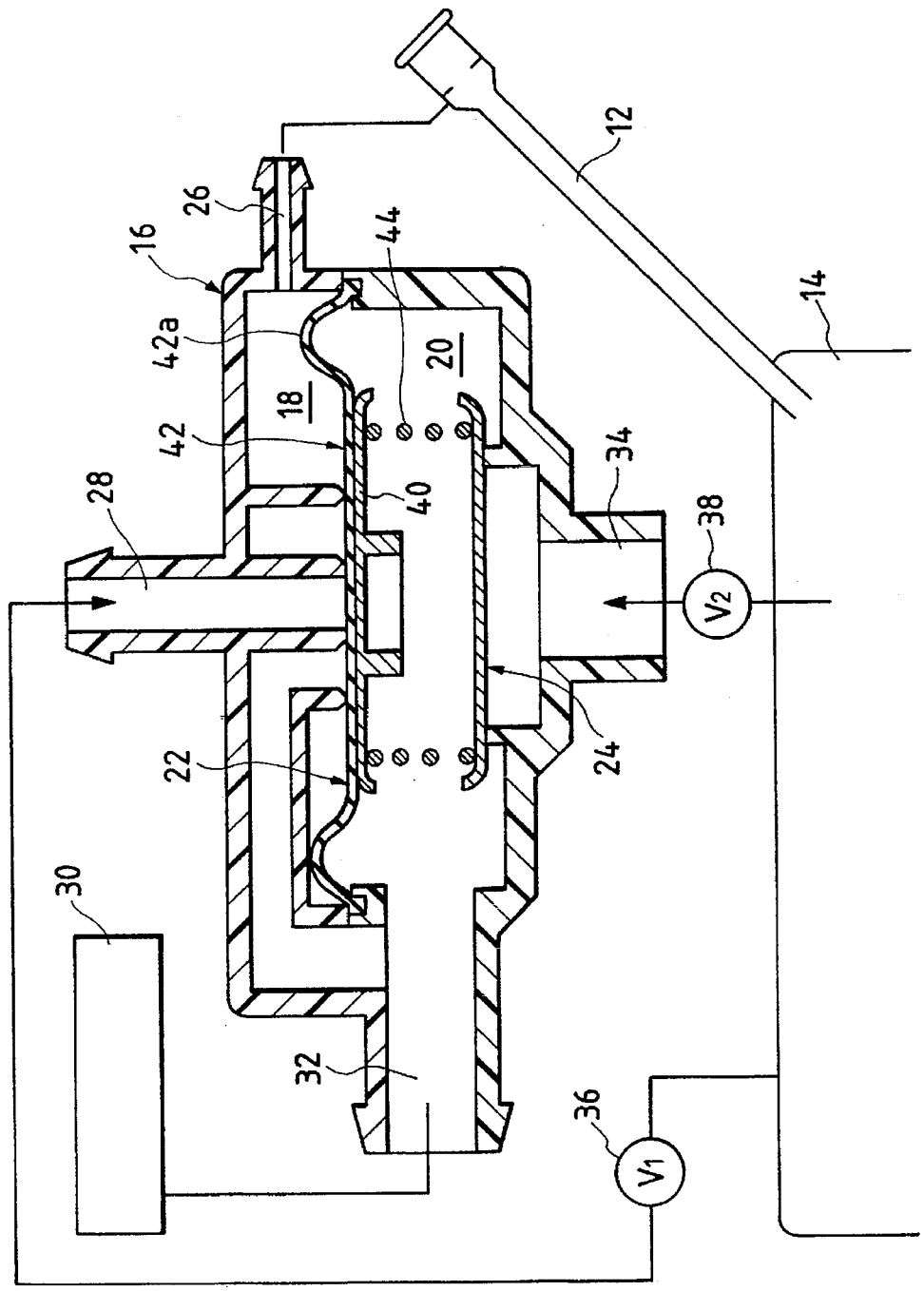
FIG. 1 is a cross-sectional view showing a conventional fuel vapor recovery control valve device.

One preferred embodiment of the invention will be described with reference to the accompanying drawings, in which parts corresponding functionally to those which have been described in reference to the conventional device shown in FIG. 1 are designated by the same reference numerals or characters.

Figure 2:
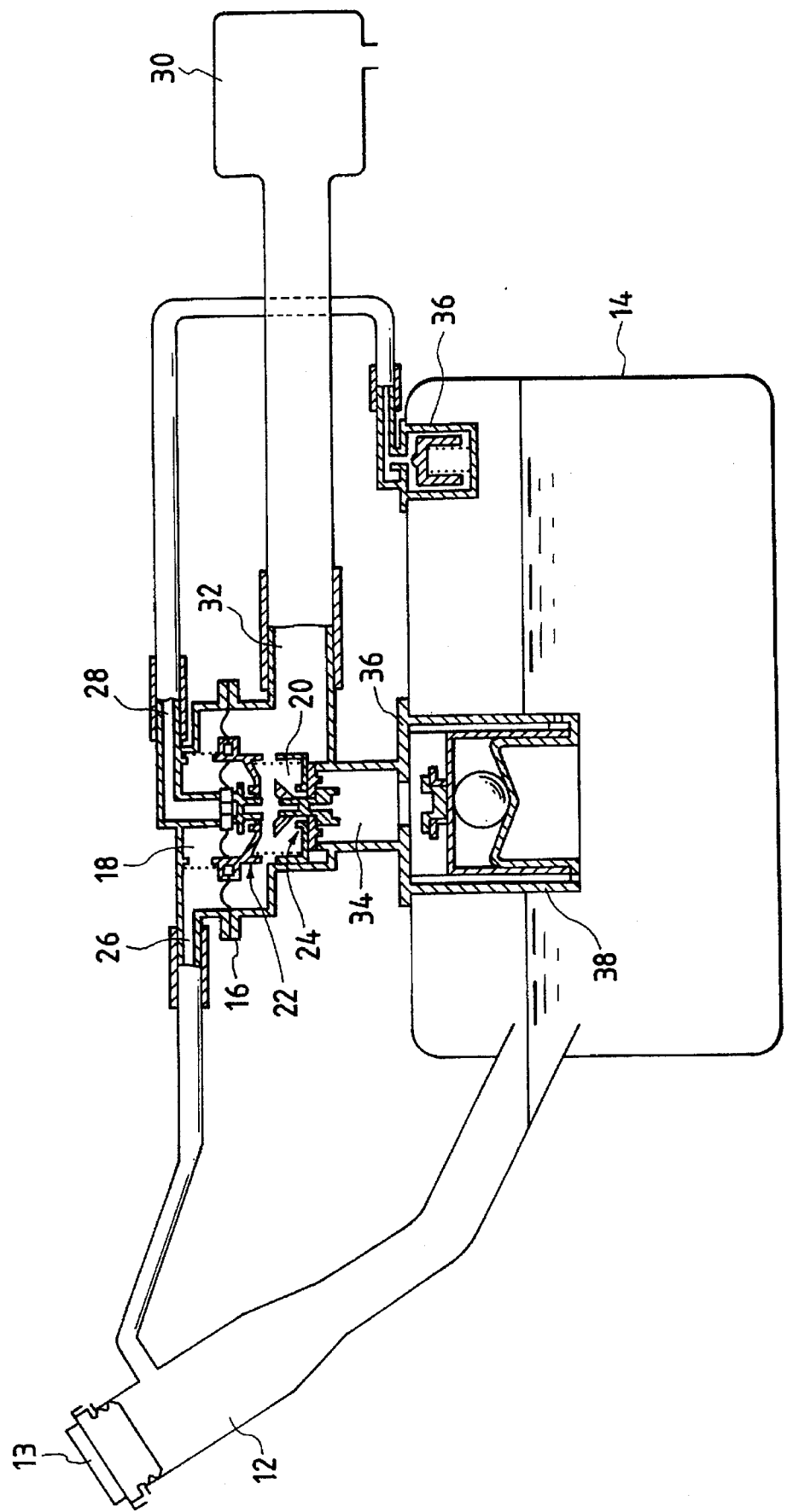
FIG. 2 is an explanatory diagram, partly in cross-section, showing a fuel vapor recovery system including an example of a fuel vapor recovery control valve device according to the invention.
Figure 3:
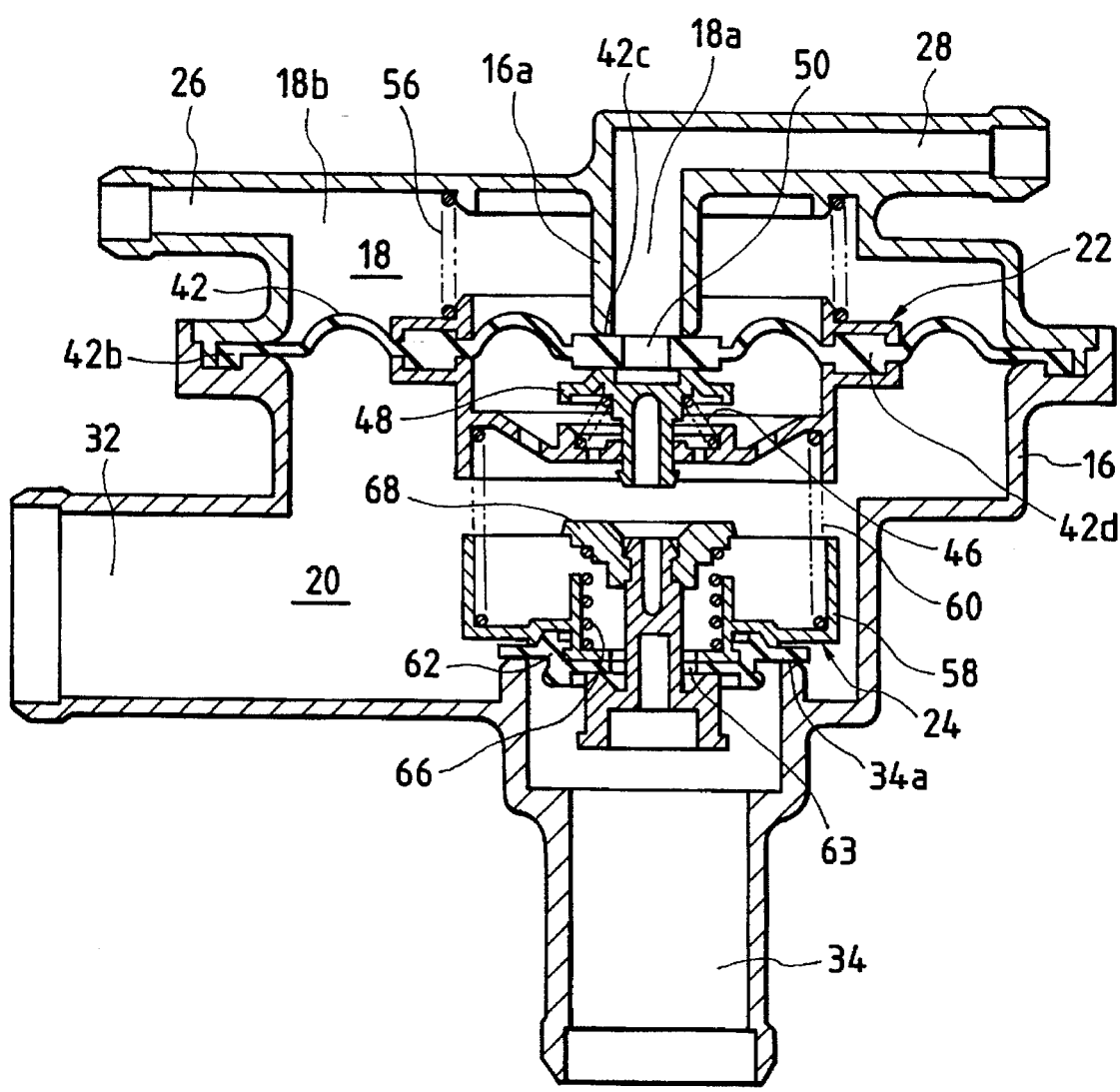
FIG. 3 is a cross-sectional view showing the positions of valves in the device of the invention before a fuel supplying operation.

The fundamental arrangement of a fuel vapor recovery control valve device is as follows:

The device, as shown in FIGS. 2 and 3, comprises: a housing 16; a first valve assembly 22 which is moved up an down by a diaphragm 42 which divides the space in the housing 16 into an upper chamber 18 and a lower chamber 20; and a second valve assembly 24 made up of positive and negative pressure valve bodies. The housing 16 has a signal port 26 and a first vapor flow-in port 28 on the upper chamber side, and a vapor recovery port 32 and a second vapor flow-in port 34 on the lower chamber side. The vapor recovery port 32 communicates with a canister 30, and the second vapor flow-in port 34 is operated (opened and closed) by the second valve assembly 24. The signal port 26 communicates with an fuel filler port 12. The first vapor flow-in port 28 communicates, through a fuel cut-off valve 36, to a fuel tank 14, and the second vapor flow-in port 34 also communicates, through a float valve 38, to the fuel tank 14.

The above-described fundamental arrangement of the device is same with that of the conventional device except that the diaphragm extends across the whole housing to divide the housing into the upper and lower chambers.

The housing 16 is made up of upper and lower halves. The upper and lower halves are sealingly joined together through the outer peripheral portion 42b of the diaphragm 42.

The diaphragm 42, as shown in FIGS. 2 and 3, comprises a central node portion (or a central thick portion) 42c, and an intermediate node portion (or an intermediate thick portion) 42d between the central node portion 42c and the outer peripheral portion 42b; that is, the diaphragm 42 is of a double operation diaphragm structure. The housing 16 includes a cylindrical partition wall 16a, against which the central node portion 42c of the diaphragm 42 is abutted. The cylindrical partition wall 16a divides the upper chamber 18 into an upper inside chamber 18a, which communicates with the first vapor flow-in port 28, and an upper outside chamber 18b, which communicates with the signal port 26.

The central node portion 42c of the diaphragm 42 has a communicating hole 50 through which the upper chamber 18 communicates with the lower chamber 20. An auxiliary valve body (a positive pressure valve body) 48 is provided below the central node portion 42c to open and close the communicating hole 50.

Figure 4:
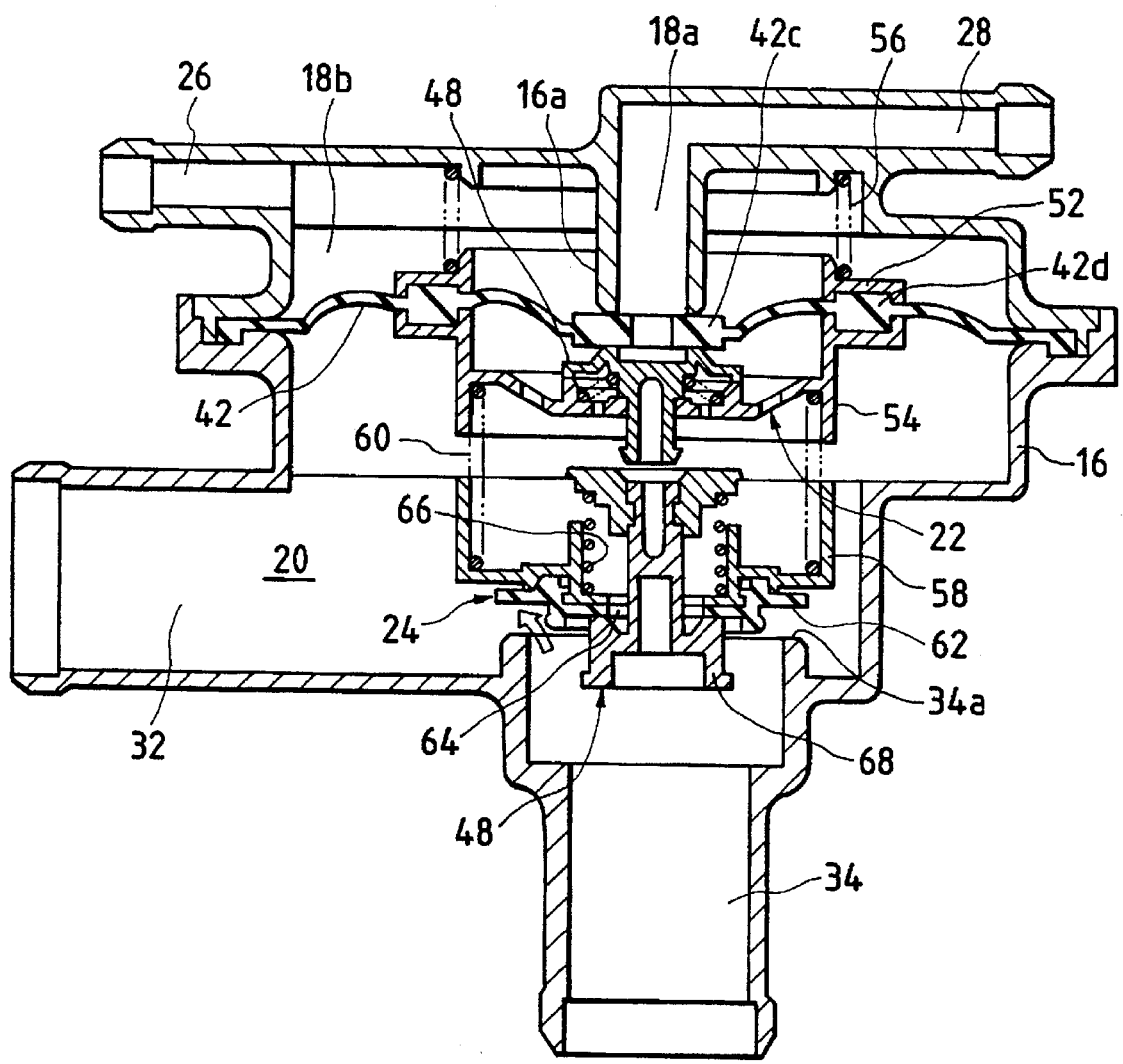
FIG. 4 is a cross-sectional view showing the positions of the valves in the device during the fuel supplying operation.

As shown in FIG. 4., the intermediate node portion 42d of the diaphragm 42 is held between an upper supporting plate 52 and a lower supporting plate 54, which serves also as a casing for accommodating the auxiliary valve body 48. An upper compression spring 56 is interposed between the upper supporting plate 52 and the top wall of the housing 16, while a lower compression spring 60 is interposed between the lower supporting plate 54 and the bottom wall of the housing 16 through a cylindrical spring seat 58, which serves also as a casing for accommodating the second valve assembly 24. The upper compression spring 56 and the lower compression spring 60 are elastically balanced with each other to hold the intermediate node portion 42d in the plane which divides the housing 16 into two parts. Hereinafter, the position of the intermediate node portion 42d thus held will be referred to as "a balanced position", when applicable.

The second valve assembly 24 is made up of positive and negative pressure valve bodies. More specifically, it comprises: a negative pressure valve body 68 which is urged by a spring 66 to close the valve opening 64 of an elastic sealer 62; and a positive pressure valve body made up of the elastic sealer 62 which, with the edge 34a of the upper end opening of the second vapor flow-in port 34 as a valve seat, is urged by the aforementioned compression spring 60 in the direction of closure. The second valve assembly 24 may also be a positive pressure valve as in the case of the above-described conventional art shown in FIG. 1.

The device thus constructed functions as follows:

Before a fuel supplying operation starts, that is, when the cap 13 (See FIG. 2) is removed from the fuel tank 14, the state of the device is as shown in FIG. 3. The inside of the fuel tank 14 communicates with the atmosphere through the fuel filler port 12. That is, atmospheric pressure is present in the upper inside chamber 18a, the upper outside chamber 18b and the lower chamber 20, so that the central node portion 42c of the diaphragm 42 is abutted against the edge of the lower end opening of the cylindrical partition wall 16a, and the intermediate node portion 42d is held at the balanced position.

During the fuel supplying operation, the state of the device is as shown in FIG. 4. The upper outside chamber 18b is communicated with the atmosphere through the signal port 26 and the fuel filler port 12, so that atmospheric pressure is present in the upper outside chamber 18b. On the other hand, as fuel is supplied into the fuel tank 14, fuel vapor is formed in the tank, so that a positive pressure is developed in the fuel tank 14. When the pressure in the fuel tank 14 reaches a predetermined value, the second valve assembly 24, closing the second vapor flow-in port 34, is moved upwardly against the elastic force of the upper compression spring 56 and the lower compression spring 60, so that the positive pressure valve body 62 leaves the valve seat 34a; that is, the second vapor flow-in portion 34 is opened. As a result, the fuel vapor in the fuel tank 14 is led through the lower chamber 20 and the vapor recovery port 32 into the canister 30. In this operation, the intermediate node 42d is moved upwardly.

When the fuel tank 14 is closed with the cap 13, the upper inside chamber 18a, the upper outside chamber 18b, and the second vapor flow-in port 34 are all communicated with the inside of the fuel tank 14, so that the pressures in them are equal to the pressure in the fuel tank. On the other hand, atmospheric pressure is present in the lower chamber 20 because the lower chamber 20 is communicated with the atmosphere through the canister 30.

Figure 5:
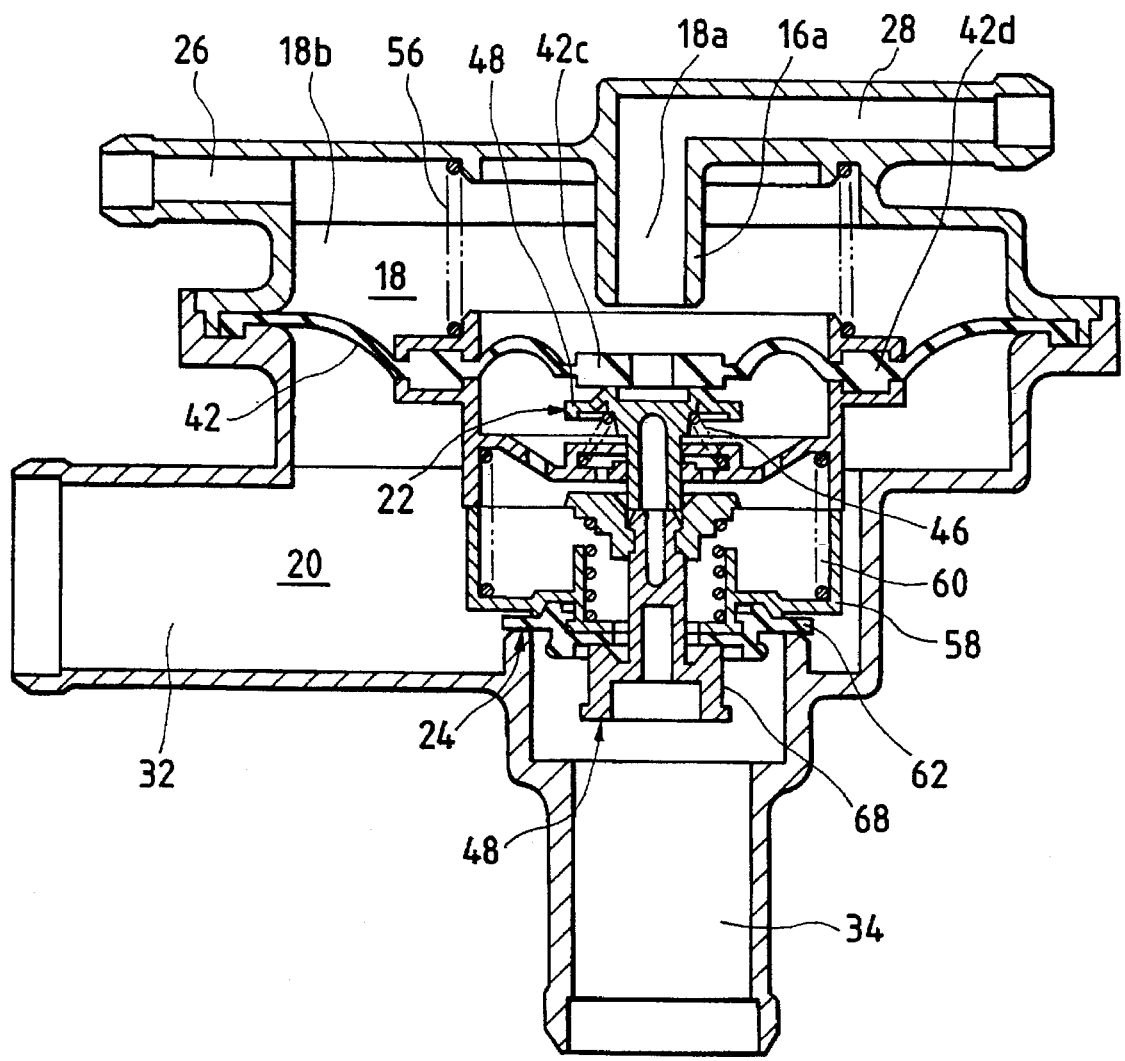
FIG. 5 is a cross-sectional view showing the state of the device when the pressure in the fuel tank is positive and is at a predetermined first value or higher.

Hence, when the pressure in the fuel tank is positive, and is a predetermined first value or higher, as shown in FIG. 5, the intermediate node 42d of the diaphragm 42 is moved downwardly against the elastic force of the lower compression spring 60, and the central node portion 42c is spaced from the edge of the lower end opening of the cylindrical partition wall 16a. At the same time, the positive valve body 48 of the first valve assembly 22 closes the communicating hole 50 of the central node portion 42c, while the second valve assembly 24 (positive and negative pressure valve bodies) closes the second vapor flow-in port 34.

When the internal pressure of the fuel tank is further increased to a second predetermined value, the positive pressure valve body 48 is opened against the elastic force of the spring 46, so that the fuel vapor in the fuel tank may flow through the first vapor flow-in port 28, into the lower chamber 20, out the vapor recovery port 32, and into the canister 30. In this operation, fuel vapor condensed and accumulated on the diaphragm 42 is caused to flow into the lower chamber 20.

Figure 6:
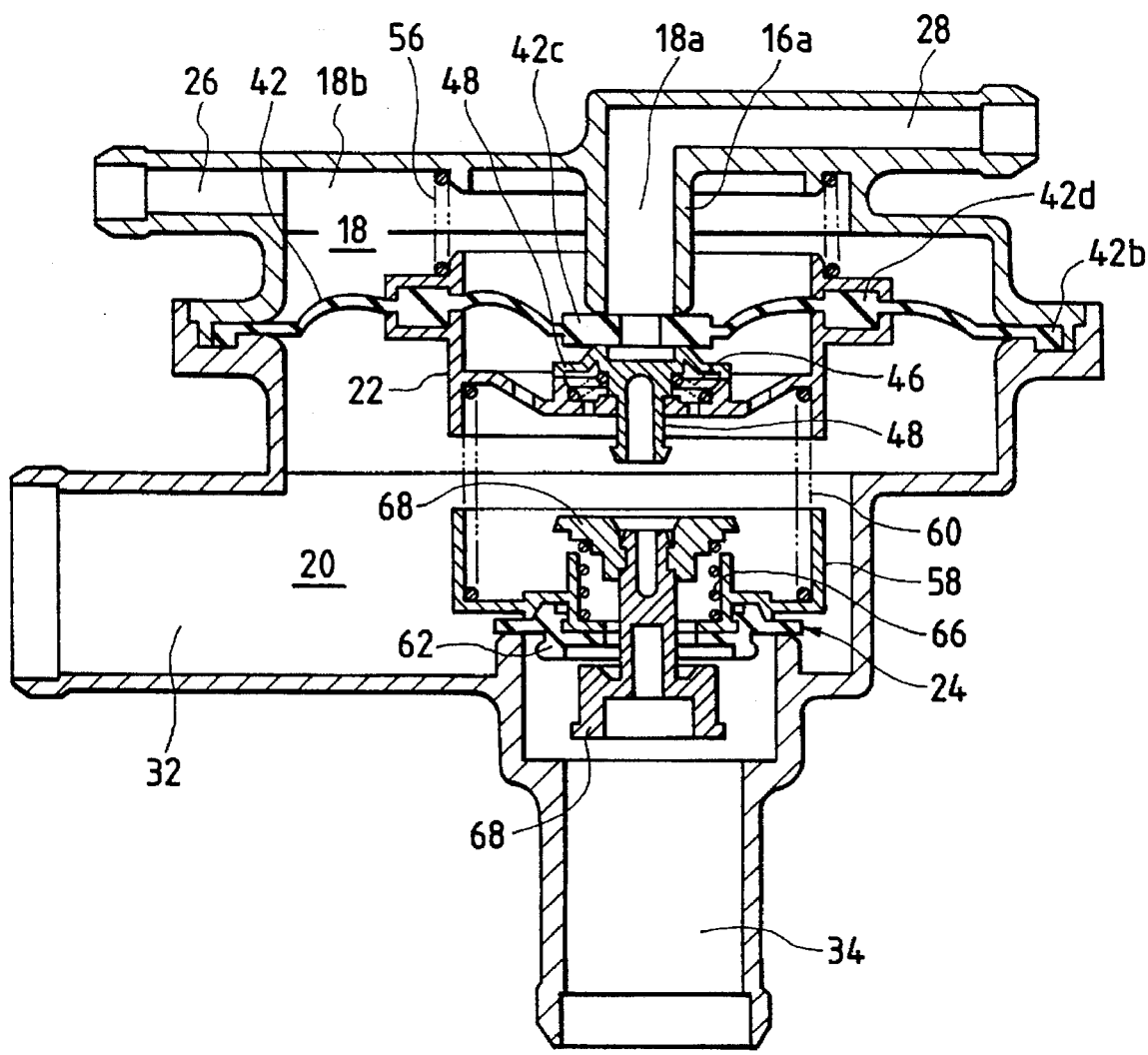
FIG. 6 is a cross-sectional view showing the state of the device when the pressure in the fuel tank is negative and is at a predetermined value or lower.

In the case where the pressure in the fuel tank is negative, and is at a predetermined value or lower, the state of the device is as shown in FIG. 6. That is, the intermediate node portion 42d of the diaphragm 42 is moved upwardly against the elastic force of the spring 56, and the negative pressure valve body 68 of the second valve assembly 24 is opened. As a result, the inside of the fuel tank is in communication, through the canister 30, with the atmosphere, so that air flows into the fuel tank 14.

Figure 7:
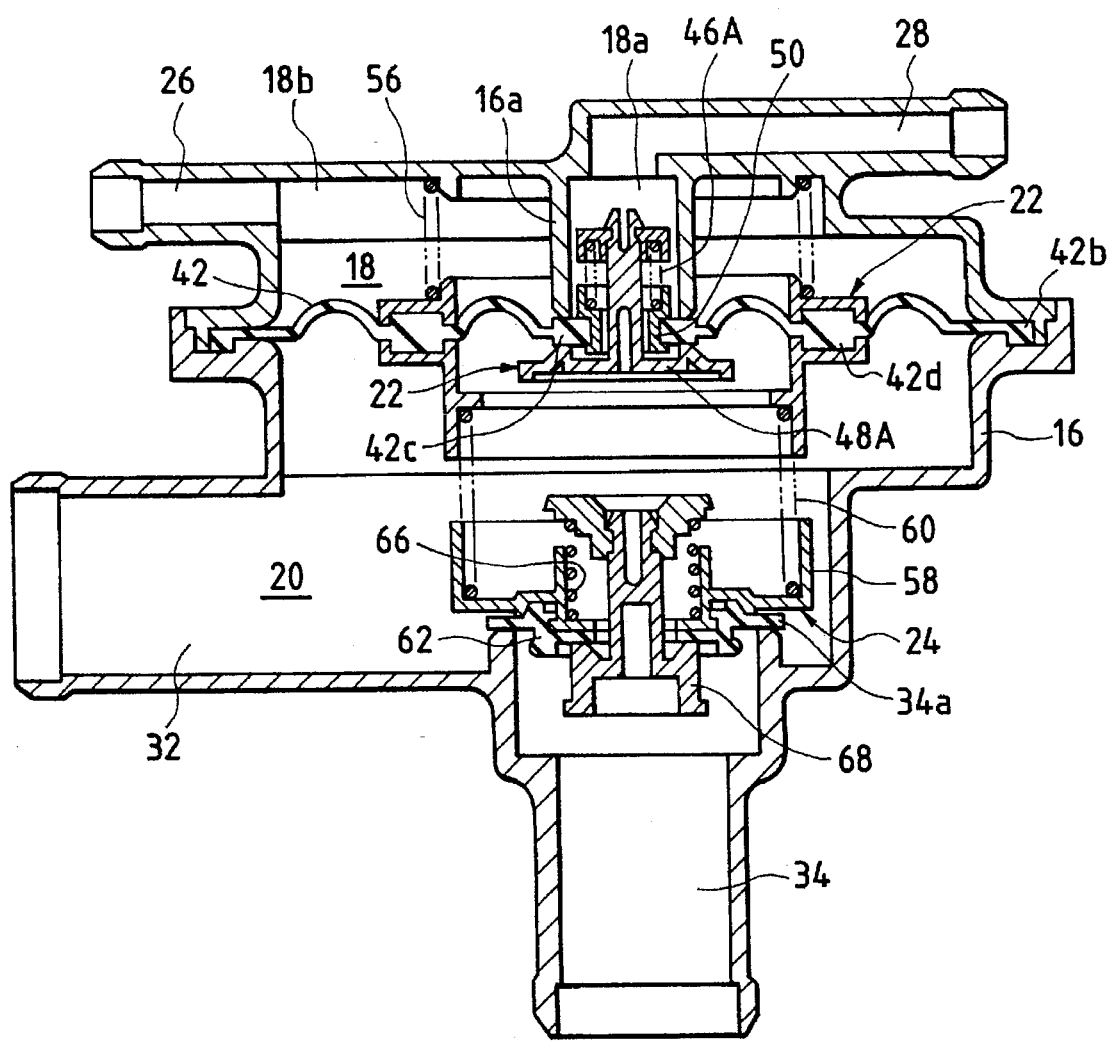
FIG. 7 is a cross-sectional view showing one modification of the device of the invention (before a fuel supplying operation starts).

FIG. 7 shows one modification of the above-described embodiment. The modification is different from the embodiment in the structure of a positive pressure valve body 48A in which an urging spring 46A is provided on the side of the upper chamber 18. The modification, when compared with the embodiment, is advantageous in the following points:

The first valve assembly 22 is mounted directly on the diaphragm 42. Hence, the valve opening pressure for the positive pressure valve body 48 is accurate, and it is stable independent of the vertical position of the intermediate node portion 42d of the diaphragm 42. In this connection, it should be noted that, in the above-described embodiment, as shown in FIG. 6, when the diaphragm 42 is raised, the closing force of first valve assembly 22 is increased. It goes without saying that the modification operates in the same way as the above-described embodiment.

As is apparent from the above description, the fuel vapor recovery control valve device of the invention has the following effects or merits:

The diaphragm adapted to move the first valve assembly up and down is of a double operation film structure having the intermediate node portion. Hence, the sealing of the lower end of the cylindrical partition wall, which separates the upper inside chamber from the upper outside chamber, with the central node portion of the diaphragm is never adversely affected, for instance, by the urging springs, even when unbalanced.

The central node portion of the diaphragm has the communicating hole through which the upper chamber communicates with the lower chamber, and the communicating hole is opened and closed by the positive valve body. Hence, no fuel vapor is condensed and accumulated on the diaphragm.

While the present invention has been described in connection with the presently preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A fuel vapor recovery control valve device, for controlling the discharge of fuel vapor from a fuel tank with a fuel filler port, comprising:

a housing enclosing a space therein;

a first valve assembly which is moved up and down by a diaphragm which divides the space in said housing into an upper chamber and a lower chamber; and a second valve assembly provided in said lower chamber; wherein said housing includes:

a signal port and a first vapor flow-in port in communication with said upper chamber, and a fuel recovery port communicated with a canister and a second vapor flow-in port, which is opened and closed by said second valve assembly, in communication with the lower chamber, said signal port being communicated with said fuel filler port, said first vapor flow-in port and said second vapor flow-in port being communicated, through a fuel cut-off valve and a tank full-up regulating valve, respectively, to said fuel tank, said diaphragm being of double operation diaphragm structure including a central node portion and an intermediate node portion between said central node portion and an outer peripheral portion of said diaphragm, said upper chamber being divided into an upper inside chamber, which is communicated with said first vapor flow-in port, and an upper outside chamber, which is communicated with said signal port, by a cylindrical partition wall which is abutted against said central node portion of said diaphragm.

2. A fuel vapor recovery control valve device according to claim 1, wherein said central node portion of said diaphragm has a communicating hole through which said upper chamber is communicated with said lower chamber, and said device is provided with a positive pressure valve body to open and close said communicating hole from below.

3. A fuel vapor recovery control valve device according to claim 1, in which said second valve assembly comprises positive and negative pressure valve bodies.

4. A fuel vapor recovery control valve device according to claim 2, in which said second valve assembly comprises positive and negative pressure valve bodies.

* * * * *